(12) United States Patent
Musa et al.

(10) Patent No.: US 9,546,228 B2
(45) Date of Patent: Jan. 17, 2017

(54) MODIFICATION OF POLYMERS CONTAINING AN ANHYDRIDE AND USES THEREOF

(71) Applicant: ISP INVESTMENTS INC., Wilmington, DE (US)

(72) Inventors: Osama M. Musa, Kinnelon, NJ (US); Chao Zhu, Edison, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

(21) Appl. No.: 14/797,497

(22) Filed: Jul. 13, 2015

(65) Prior Publication Data

US 2015/0315307 A1    Nov. 5, 2015

Related U.S. Application Data

(62) Division of application No. 13/697,236, filed as application No. PCT/US2011/035524 on May 6, 2011, now Pat. No. 9,079,997.

(60) Provisional application No. 61/333,932, filed on May 12, 2010.

(51) Int. Cl.

| C08F 210/10 | (2006.01) |
|---|---|
| C08F 222/06 | (2006.01) |
| C08F 222/40 | (2006.01) |
| C08F 22/04 | (2006.01) |
| C08F 30/08 | (2006.01) |
| C08F 269/00 | (2006.01) |

(52) U.S. Cl.
CPC ............... *C08F 22/04* (2013.01); *C08F 30/08* (2013.01); *C08F 269/00* (2013.01)

(58) Field of Classification Search
None
See application file for complete search history.

(56) References Cited

U.S. PATENT DOCUMENTS

| 6,025,501 A | 2/2000 | Ulmer et al. |
|---|---|---|
| 6,174,843 B1 | 1/2001 | Peyton et al. |
| 6,187,886 B1 | 2/2001 | Husson, Jr. et al. |
| 6,562,928 B1 | 5/2003 | Plochocka |
| 2004/0235976 A1 | 11/2004 | Hoyle et al. |
| 2012/0258313 A1 | 10/2012 | Wen et al. |

OTHER PUBLICATIONS

International Search Report, PCT/US2011/035524, published on Nov. 17, 2011.

*Primary Examiner* — Vu A Nguyen
(74) *Attorney, Agent, or Firm* — William J. Davis

(57) ABSTRACT

The present invention provides polymers resulting from modification of polymeric moieties containing an anhydride with modifying reactant moieties. The invention further provides a wide variety of compositions comprising the and modified polymeric moieties containing an anhydride. The letters b, d, e, and z are described herein.

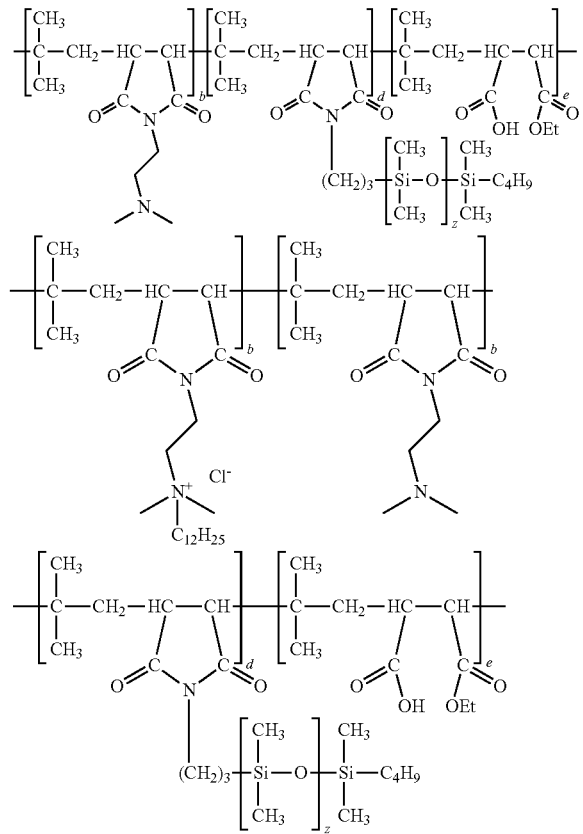

13 Claims, No Drawings

MODIFICATION OF POLYMERS CONTAINING AN ANHYDRIDE AND USES THEREOF

CROSS-REFERENCE TO RELATED APPLICATIONS

This application is a divisional of U.S. application Ser. No. 13/697,236 filed Feb. 21, 2013, now allowed (allowed to be granted as U.S. Pat. No. 9,079,997) and which was the National Stage of International Application No. PCT/US2011/035524, filed May 6, 2011 which claims the benefit of U.S. Provisional Application No. 61/333,932 filed May 12, 2010. The entire contents of the related applications set forth herein are hereby incorporated by reference.

BACKGROUND OF THE INVENTION

Field of the Invention

The present invention provides polymers resulting from modification of polymeric moieties containing an anhydride with modifying reactant moieties. The invention further provides a wide variety of compositions comprising the modified polymeric moieties containing an anhydride.

Description of Related Art

Reaction of maleic anhydride polymers with amines to provide polymeric maleimides, maleamic acids, and maleic anhydride half esters and full esters are known, U.S. Pat. No. 6,025,501. These polymeric products are particularly useful in personal care and pharmaceutical products such as hair care and skin care products.

Modification of such polymers that result in a difference in the physical or mechanical properties of the polymers could provide additional useful personal care and pharmaceutical products. The resulting modification of the physical or mechanical properties would depend upon the nature and density of a modifying reactant moiety. Accordingly, there is a need for polymers resulting from modification of polymeric moieties containing an anhydride with modifying reactant moieties to alter or improve the physical and mechanical properties of such polymers.

SUMMARY OF THE INVENTION

The present invention provides polymers resulting from modification of a polymeric moiety containing an anhydride with a modifying reactant moiety, wherein the polymeric moiety containing an anhydride has the structure:

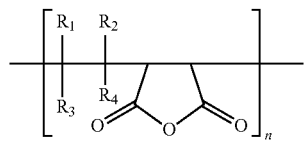

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; n is an integer ranging from about 10 to about 100,000; the modifying reactant moiety is selected from the group consisting of Q-$R_{10}$—$NH_2$, Z—$NH_2$, and E-OH, and mixtures thereof; wherein Q is a siloxane and $R_{10}$ is selected from the group consisting of alkyl, cycloalkyl, and aryl groups; Z is selected from the group consisting of hydrogen, alkyl, haloalkyl, aryl, silyl, and tertiary amine groups having the structure:

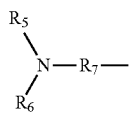

quaternary amine groups having the structure:

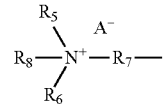

and polyether groups having the structure:

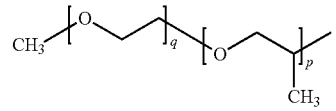

wherein $R_5$, $R_6$, $R_7$, and $R_8$ are independently selected from the group consisting of alkyl, cycloalkyl, and aryl groups; K is an anion; q and p are integers independently ranging from about 1 to about 10,000; E is a siloxane or is selected from the group consisting of hydrogen, alkyl, haloalkyl, aryl, silyl, amino groups, and mixtures thereof; to provide a modified polymer having the structure:

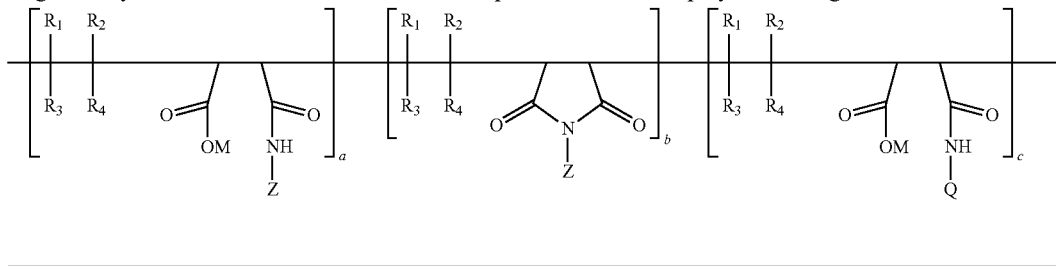

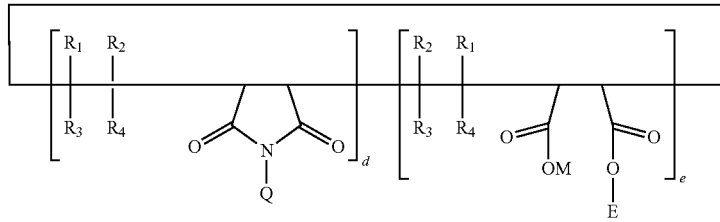

wherein $R_1$, $R_2$, $R_3$, and $R_4$ are as described above; Q, Z, and E are derived from the modifying reactant moieties as described above; M is hydrogen or a monovalent or divalent metal ion; a, b, c, d, and e are integers ranging from 0 to about 10,000; with the proviso that both c and d cannot both be zero at the same time; wherein the polymer is alternating, blocked, or random.

The present invention also provides polymers having the structure:

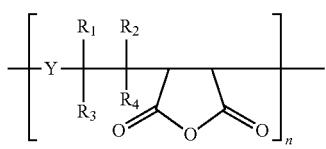

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; Y is derived from the group consisting of vinyl amides, acrylates, styrenes, maleimides, maleates, fumarates, cinnamyls, vinyl imidazoles, vinyl pyridines, vinyl acetates, acrylamides, vinyl sulfones, vinyl carbonates, vinyl silanes, vinyl acrylamides, allyl derivatives, vinyl ethers, and mixtures thereof; and n is an integer ranging from about 10 to about 100,000; wherein the polymer is alternating, blocked, or random.

The present invention further provides polymers resulting from modification of a polymeric moiety containing an anhydride with a modifying reactant moiety, wherein the polymeric moiety containing an anhydride has the structure:

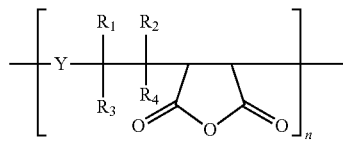

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; Y is derived from the group consisting of vinyl amides, acrylates, styrenes, maleimides, maleates, fumarates, cinnamyls, vinyl imidazoles, vinyl pyridines, vinyl acetates, acrylamides, vinyl sulfones, vinyl carbonates, vinyl silanes, vinyl acrylamides, allyl derivatives, vinyl ethers, and mixtures thereof; and n is an integer ranging from about 10 to about 100,000; the modifying reactant moiety is selected from the group consisting of $Q$-$R_{10}$—$NH_2$, $Z$—$NH_2$, and E-OH, and mixtures thereof; wherein Q is a siloxane and $R_{10}$ is selected from the group consisting of alkyl, cycloalkyl, and aryl groups; Z is selected from the group consisting of hydrogen, alkyl, haloalkyl, aryl, silyl, and tertiary amine groups having the structure:

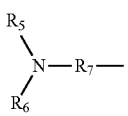

quaternary amine groups having the structure:

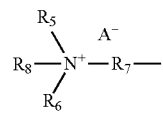

and polyether groups having the structure:

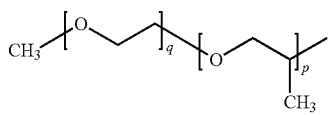

wherein $R_5$, $R_6$, $R_7$, and $R_8$ are independently selected from the group consisting of alkyl, cycloalkyl, and aryl groups; $A^-$ is an anion; q and p are integers independently ranging from about 1 to about 10,000; E is a siloxane or is selected from the group consisting of hydrogen, alkyl, haloalkyl, aryl, silyl, amino groups, and mixtures thereof; to provide a modified polymer having the structure:

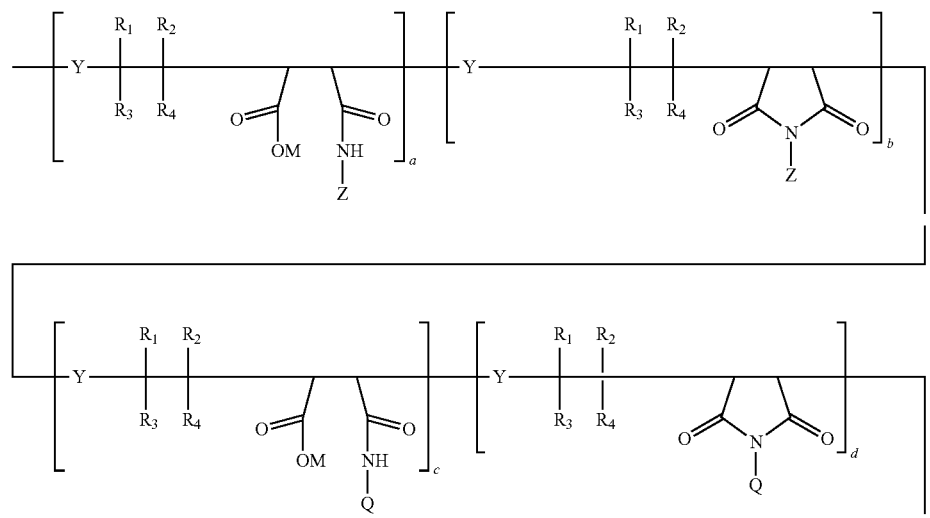

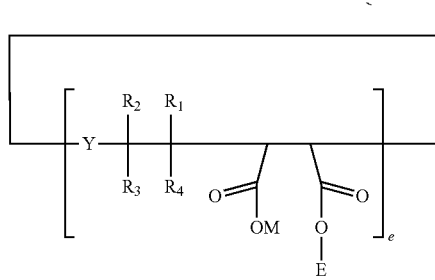

wherein $R_1$, $R_2$, $R_3$, and $R_4$ are as described above; Q, Z, and E are derived from the modifying reactant moieties as described above; M is hydrogen or a monovalent or divalent metal ion; a, b, c, d, and e are integers ranging from 0 to about 10,000; with the proviso that at least two of a, b, c, d, and e cannot both be zero at the same time; wherein the polymer is alternating, blocked, or random.

The present invention further provides a wide variety of compositions comprising the above polymers.

DETAILED DESCRIPTION OF THE INVENTION

The present invention provides polymers resulting from modification of polymeric moieties containing an anhydride with modifying reactant moieties. The invention further provides a wide variety of compositions comprising the modified polymers including adhesives, aerosols, agricultural compositions, beverages, cleaning compositions, coating compositions, cosmetic formulations, dental compositions, detergents, drugs, encapsulations, foods, hair sprays, lithographic solutions, membrane formulations, oilfield formulations, personal care compositions, pharmaceuticals, pigment dispersions, and the like. Personal care compositions refers to such illustrative non-limiting compositions as skin, sun, oil, hair, cosmetic, and preservative compositions, including those to alter the color and appearance of the skin. Other personal care compositions include, but are not limited to, polymers for increased flexibility in styling, durable styling, increased humidity resistance for hair, skin, and color cosmetics, sun care water-proof/resistance, wear-resistance, and thermal protecting/enhancing compositions. Dental personal care compositions include denture adhesives, toothpastes, mouth washes, and the like. Pharmaceutical compositions include tablet coatings, tablet binders, transdermal patches, and the like.

As used herein, the following terms have the meanings set out below.

The term "polymeric moieties containing an anhydride" refers to anhydride containing polymeric moieties preferably with an alkyl chain. A preferred illustrative example of such a moiety has the structure set out below:

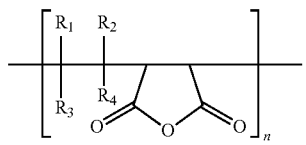

wherein $R_1$, $R_2$, $R_3$, $R_4$ and n are described below.

The term "anion" ($A^-$) refers to an ion with more electrons than protons, giving it a net negative charge. An anion consisting of a single atom is a monatomic anion. An anion consisting of two or more atoms is a polyatomic anion. Polyatomic anions containing oxygen, such as carbonates, sulfates, and phosphonates are called oxyanions. Non-limiting illustrative examples of anions useful in the present invention include halogens, carbonate, hydrogen carbonate, hydroxide, nitrate, phosphate, sulfate, thiosulfates, anions from organic acids, and cyanide. Preferred anions include chloride, carbonate, hydrogen carbonate, hydroxide, nitrate, phosphate, and sulfate.

The term "branched and unbranched alkyl groups" refers to alkyl groups, which may be straight chained or branched, Preferably, the alkyl groups have from 1 to about 18 carbon atoms, more preferably, from 1 to 10 carbon atoms, and most preferably from 1 to 6 carbon atoms. Branched groups include isopropyl, tert-butyl, and the like.

The term "heteroatom" refers to atoms such as oxygen, nitrogen, sulfur, and phosphorous.

The term "M" refers to hydrogen or an alkali metal or an alkaline earth metal. The alkali metals comprise lithium, sodium, potassium, rubidium, caesium, and francium; preferably the alkali metal is lithium, sodium, or potassium. The alkaline earth metals comprise beryllium, magnesium, calcium, strontium, barium, and radium, preferably the alkaline earth metal is magnesium or calcium.

The term "modifying reactant moiety" refers to moieties having a reactant group, which will react and modify the polymeric moiety containing an anhydride. In general, the modifying reactant moiety will have a primary amine or alcohol group to react and modify the polymeric moiety containing an anhydride.

The term "monomer" refers to the repeat units comprising a polymer. A monomer is a small molecule that chemically bonds to the same or other monomers to form a polymer.

The term "polymer" refers to a large molecule (macromolecule) composed of repeating structural units (monomers) connected by covalent chemical bonds.

The terms "polymeric maleimides", "polymeric maleamic acids", and "polymeric maleic anhydride half esters and full esters", in general refer, respectively, to the following structures:

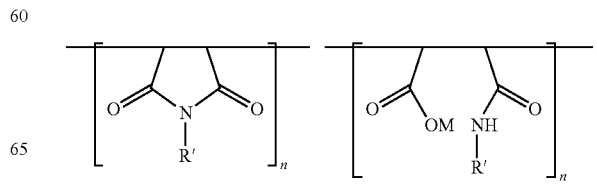

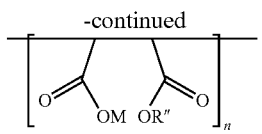

Wherein, in the present invention, R' may Z or Q and R" may be E.

The term "siloxane" refers to a chemical compound composed of units of the form $R'_2$—(—Si—)—O—, wherein R' is a hydrogen atom or an alkyl group. Siloxanes belong to the wider class of organosilicon compounds. Siloxanes can have branched or unbranched backbones consisting of alternating silicon and oxygen atoms —(—Si—)—O—(—Si—)—O—, with side chains R' attached to the silicon atoms. The word siloxane is derived from the words silicon, oxygen, and alkane. Polymerized siloxanes with alkyl group side chains are also known as silicones or as polysiloxanes.

The term "silyl" refers to an $H_3Si$— group. A silyl group is also known as a hydrocarbyl derivative of the silyl group, $R'_3$—(—Si—)—.

The present invention provides polymers resulting from modification of a polymeric moiety containing an anhydride with a modifying reactant moiety, wherein the polymeric moiety containing an anhydride has the structure:

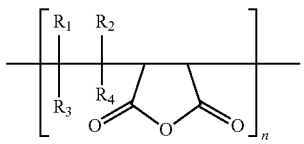

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; n is an integer ranging from about 10 to about 100,000; the modifying reactant moiety is selected from the group consisting of Q-$R_{10}$—$NH_2$, Z—$NH_2$, and E-OH, and mixtures thereof; wherein Q is a siloxane and $R_{10}$ is selected from the group consisting of alkyl, cycloalkyl, and aryl groups; Z is selected from the group consisting of hydrogen, alkyl, haloalkyl, aryl, silyl, and tertiary amine groups having the structure:

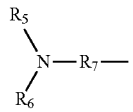

quaternary amine groups having the structure:

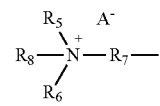

and polyether groups having the structure:

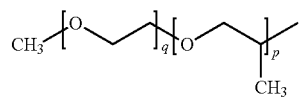

wherein $R_5$, $R_6$, $R_7$, and $R_8$ are independently selected from the group consisting of alkyl, cycloalkyl, and aryl groups; $A^-$ is an anion; q and p are integers independently ranging from about 1 to about 10,000; E is a siloxane or is selected from the group consisting of hydrogen, alkyl, haloalkyl, aryl, silyl, amino groups, and mixtures thereof; to provide a modified polymer having the structure:

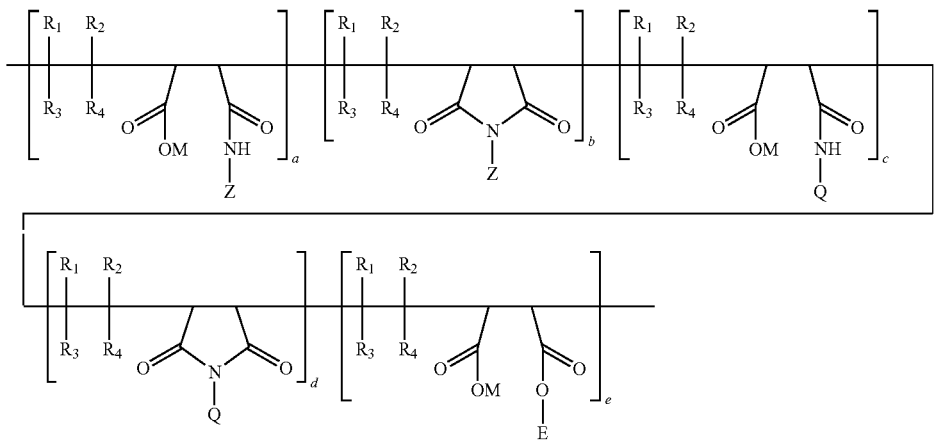

wherein $R_1$, $R_2$, $R_3$, and $R_4$ are as described above; Q, Z, and E are derived from the modifying reactant moieties as described above; M is hydrogen or a monovalent or divalent metal ion; a, b, c, d, and e are integers independently ranging from 0 to about 10,000; with the proviso that both c and d cannot both be zero at the same time; wherein the polymer is alternating, blocked, or random.

Preferably, $R_1$, $R_2$, $R_3$, and $R_4$ are independently selected from the group consisting of hydrogen, alkyl, and alkoxy groups. Preferably, n is an integer ranging from about 100 to about 10,000.

When the modifying reactant moiety is Q-$R_{10}$—$NH_2$, Q is a siloxane and $R_{10}$ is selected from the group consisting of alkyl, cycloalkyl, and aryl groups. Preferably, the siloxane has the structure:

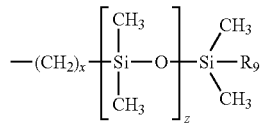

wherein $R_9$ is an alkyl or cycloalkyl group, and x and z are integers independently ranging from about 1 to about 10,000. Preferably, the integers x and z independently range from about 10 to about 5,000.

When the modifying reactant moiety is $H_2N$—Z, Z is selected from the group consisting of hydrogen, alkyl, haloalkyl, aryl, silyl, and tertiary amine groups having the structure:

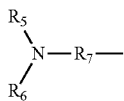

quaternary amine groups having the structure:

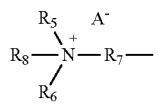

and polyether groups having the structure:

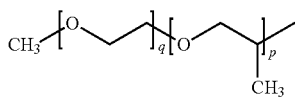

wherein $R_5$, $R_6$, $R_7$, and $R_8$ are independently selected from the group consisting of alkyl, cycloalkyl, and aryl groups. Preferably, q and p are integers independently ranging from about 1 to about 1,000, more preferably from about 1 to about 100.

Preferably, Z is selected from the group consisting of hydrogen, alkyl, haloalkyl, aryl, silyl, and tertiary amine groups having the structure:

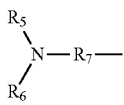

and quaternary amine groups having the structure:

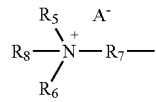

wherein $R_5$, $R_6$, $R_7$, and $R_8$ are independently selected from the group consisting of $C_1$-$C_{18}$ alkyl groups. Preferred anions ($A^-$) include chloride, carbonate, hydrogen carbonate, hydroxide, nitrate, phosphate, and sulfate.

When the modifying reactant moiety is $H_2N$-E, when E is a siloxane, the siloxane has the structure:

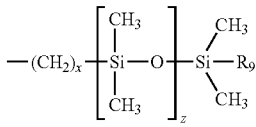

wherein $R_9$ is an alkyl or cycloalkyl group, and x and z are integers independently ranging from about 1 to about 10,000, or E is selected from the group consisting of alkyl, haloalkyl, and aryl groups, and mixtures thereof.

Preferably, the modified polymer is selected from the group of structures consisting of:

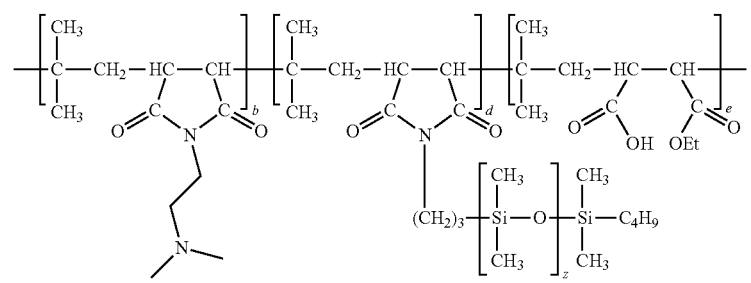

-continued
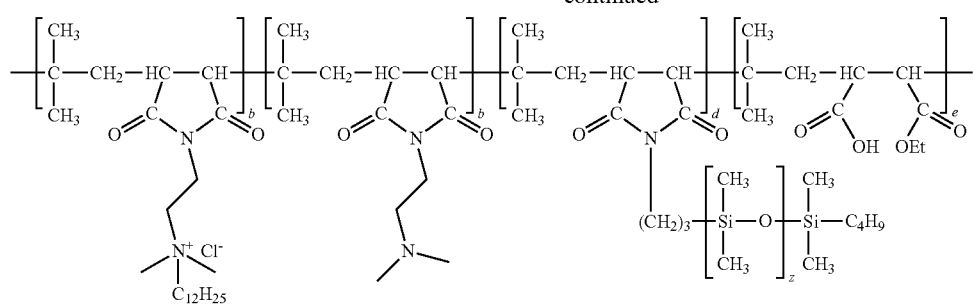
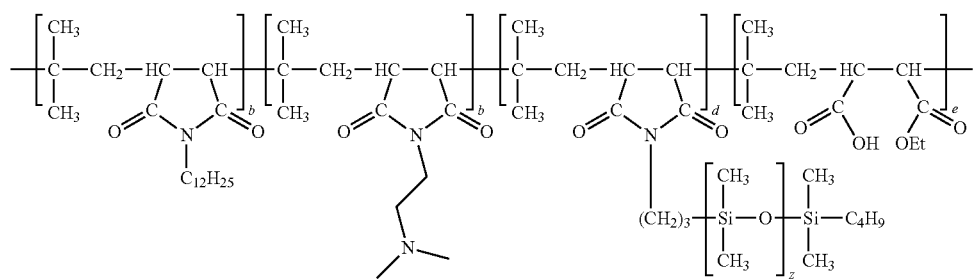
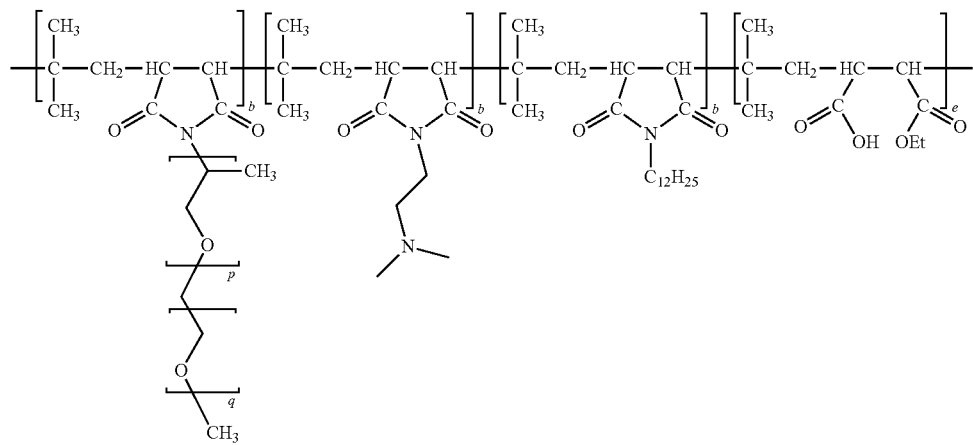
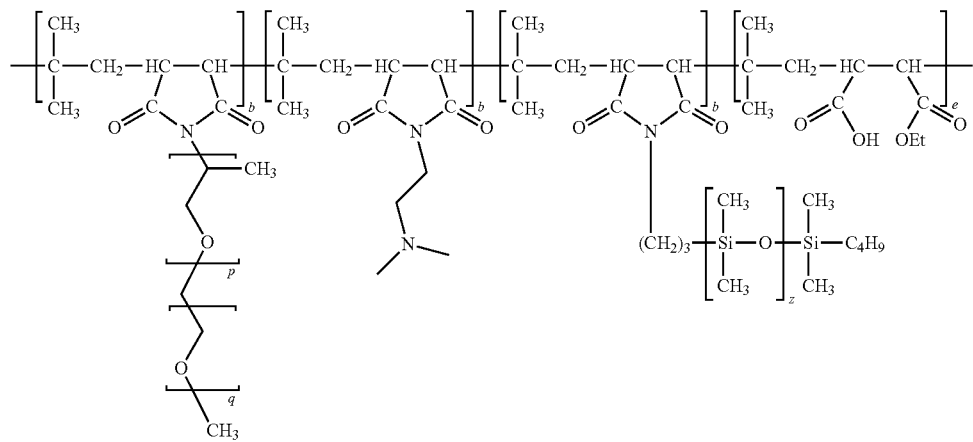

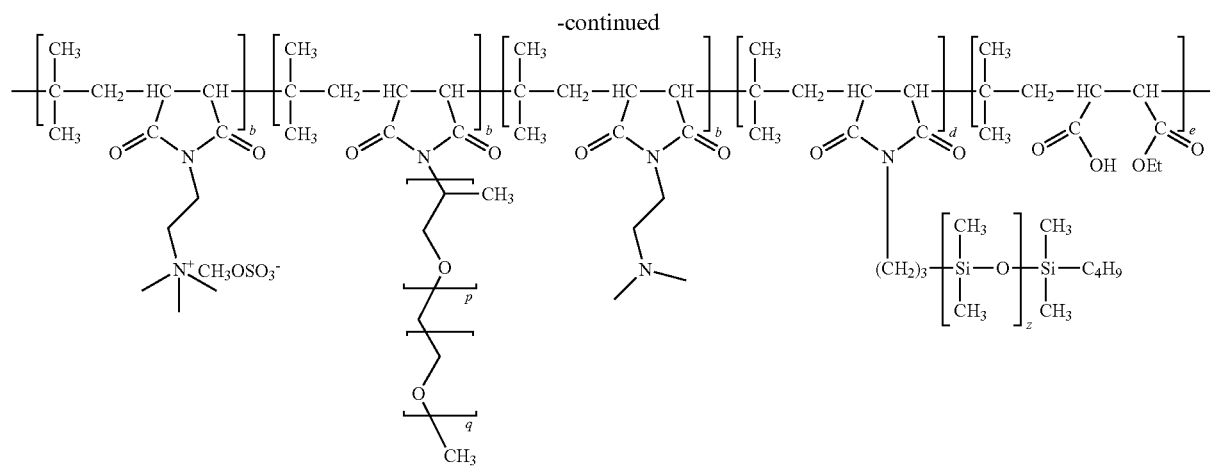
More preferably, the modified polymer is selected from the group of structures consisting of:
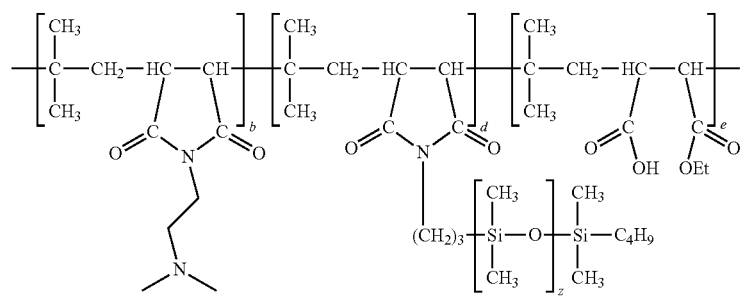
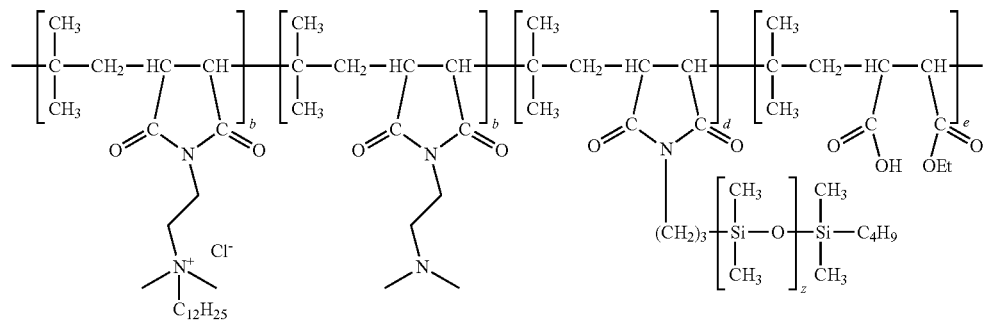
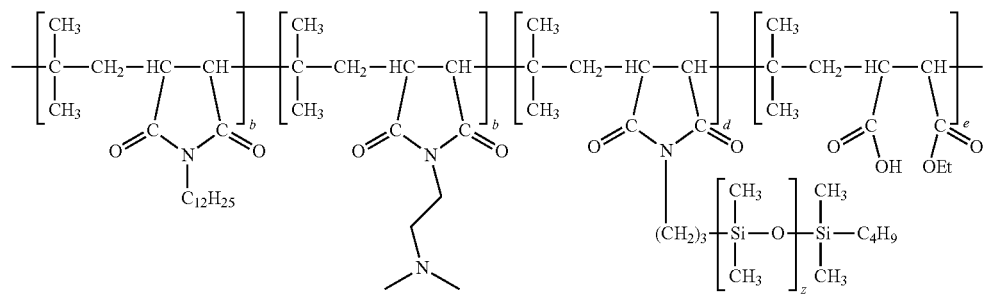

-continued

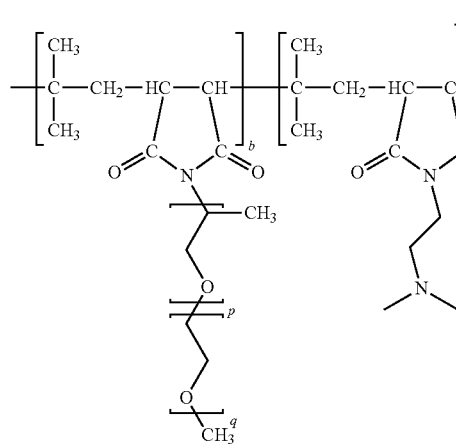
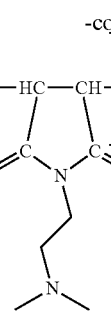
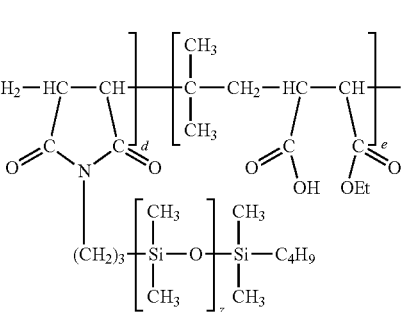

Most preferably, the modified polymer is selected from the group of structures consisting of:

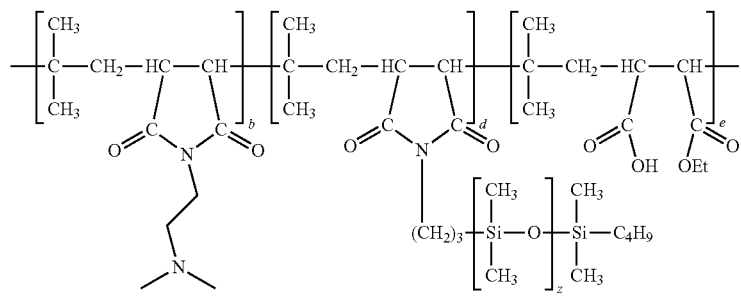

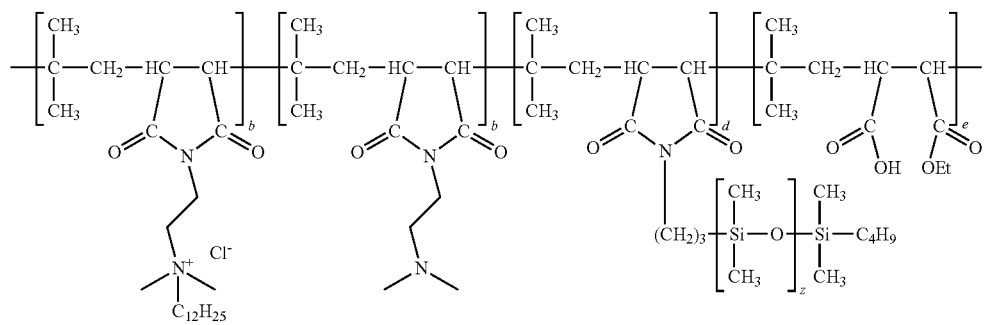

The present invention further provides polymers having the structure:

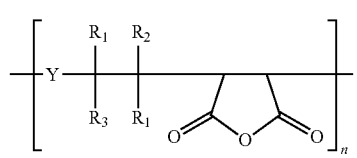

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; Y is derived from the group consisting of vinyl amides, acrylates, styrenes, maleimides, maleates, fumarates, cinnamyls, vinyl imidazoles, vinyl pyridines, vinyl acetates, acrylamides, vinyl sulfones, vinyl carbonates, vinyl silanes, vinyl acrylamides, allyl derivatives, vinyl ethers, and mixtures thereof; and n is an integer ranging from about 10 to about 100,000; wherein the polymer is alternating, blocked, or random.

Preferably, $R_1$, $R_2$, $R_3$, and $R_4$ are independently selected from the group consisting of hydrogen, alkyl, and alkoxy groups. Preferably, Y is derived from the group consisting of vinyl amides, acrylates, vinyl imidazoles, vinyl pyridines, vinyl acetates, acrylamides, and mixtures thereof. Preferably, n is an integer ranging from about 100 to about 10,000.

The present invention still further provides polymers resulting from modification of a polymeric moiety containing an anhydride with a modifying reactant moiety, wherein the polymeric moiety containing an anhydride has the structure:

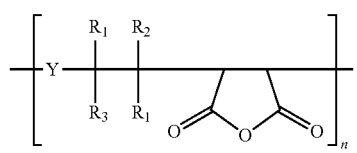

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; Y is derived from the group consisting of vinyl amides, acrylates, styrenes, maleimides, maleates, fumarates, cinnamyls, vinyl imidazoles, vinyl pyridines, vinyl acetates, acrylamides, vinyl sulfones, vinyl carbonates, vinyl silanes, vinyl acrylamides, allyl derivatives, vinyl ethers, and mixtures thereof; and n is an integer ranging from about 10 to about 100,000; the modifying reactant moiety is selected from the group consisting of Q-$R_{10}$—$NH_2$, Z—$NH_2$, and E-OH, and mixtures thereof; wherein Q is a siloxane and $R_{10}$ is selected from the group consisting of alkyl, cycloalkyl, and aryl groups; Z is selected from the group consisting of hydrogen, alkyl, haloalkyl, aryl, silyl, and tertiary amine groups having the structure:

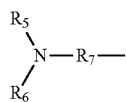

quaternary amine groups having the structure:

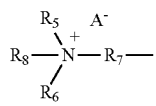

and polyether groups having the structure:

$$CH_3\text{---}[O\text{---}]_q[\text{---}O]_p CH_3$$

wherein $R_5$, $R_6$, $R_7$, and $R_8$ are independently selected from the group consisting of alkyl, cycloalkyl, and aryl groups; $A^-$ is an anion; q and p are integers independently ranging from about 1 to about 10,000; E is a siloxane or is selected from the group consisting of hydrogen, alkyl, haloalkyl, aryl, silyl, amino groups, and mixtures thereof; to provide a modified polymer having the structure:

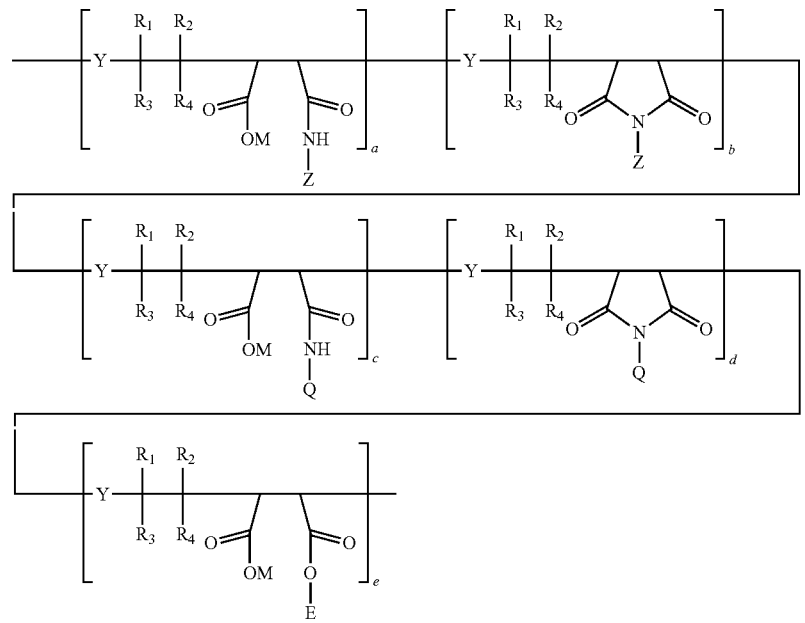

wherein $R_1$, $R_2$, $R_3$, and $R_4$ are as described above; Q, Z, and E are derived from the modifying reactant moieties as described above; M is hydrogen or a monovalent or divalent metal ion; a, b, c, d, and e are integers independently ranging from 0 to about 10,000; with the proviso that at least two of a, b, c, d, and e cannot both be zero at the same time; wherein the polymer is alternating, blocked, or random.

Preferably, $R_1$, $R_2$, $R_3$, and $R_4$ are independently selected from the group consisting of hydrogen, alkyl, and alkoxy groups. Preferably, n is an integer ranging from about 100 to about 10,000.

Preferably, Y is derived from the group consisting of vinyl amides, acrylates, vinyl imidazoles, vinyl pyridines, vinyl acetates, acrylamides, and mixtures thereof.

When the modifying reactant moiety is Q-$R_{10}$—$NH_2$, Q is a siloxane and $R_{10}$ is selected from the group consisting of alkyl, cycloalkyl, and aryl groups. Preferably, the siloxane has the structure:

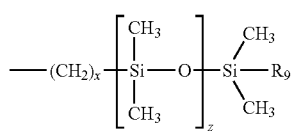

wherein $R_9$ is an alkyl or cycloalkyl group, and x and z are integers independently ranging from about 1 to about 10,000. Preferably, the integers x and z independently range from about 10 to about 5,000.

When the modifying reactant moiety is Z—NH$_2$, Z is selected from the group consisting of hydrogen, alkyl, haloalkyl, aryl, silyl, and tertiary amine groups having the structure:

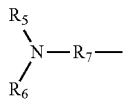

quaternary amine groups having the structure:

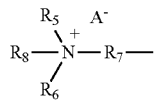

and polyether groups having the structure:

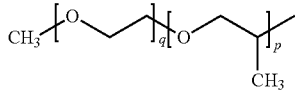

wherein $R_5$, $R_6$, $R_7$, and $R_8$ are independently selected from the group consisting of alkyl, cycloalkyl, and aryl groups.

Preferably, Z is selected from the group consisting of hydrogen, alkyl, haloalkyl, aryl, silyl, and tertiary amine groups having the structure:

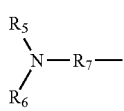

and quaternary amine groups having the structure:

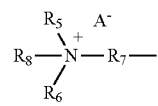

wherein $R_5$, $R_6$, $R_7$, and $R_8$ are independently selected from the group consisting of $C_1$-$C_{18}$ alkyl groups. Preferred anions ($A^-$) include chloride, carbonate, hydrogen carbonate, hydroxide, nitrate, phosphate, and sulfate.

When the modifying reactant moiety is H$_2$N-E, when E is a siloxane, the siloxane has the structure:

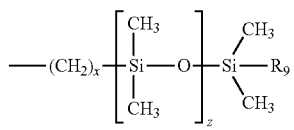

wherein $R_9$ is an alkyl or cycloalkyl group, and x and z are integers independently ranging from about 1 to about 10,000, or E is selected from the group consisting of alkyl, haloalkyl, and aryl groups, and mixtures thereof.

The present invention further provides a wide variety of compositions comprising the modified polymers including adhesives, aerosols, agricultural compositions, beverages, cleaning compositions, coating compositions, cosmetic formulations, dental compositions, detergents, drugs, encapsulations, foods, hair sprays, lithographic solutions, membrane formulations, oilfield formulations, personal care compositions, pharmaceuticals, pigment dispersions, and the like. Personal care compositions refers to such illustrative non-limiting compositions as skin, sun, oil, hair, cosmetic, and preservative compositions, including those to alter the color and appearance of the skin. Other personal care compositions include, but are not limited to, polymers for increased flexibility in styling, durable styling, increased humidity resistance for hair, skin, and color cosmetics, sun care water-proof/resistance, wear-resistance, and thermal protecting/enhancing compositions. Dental personal care compositions include denture adhesives, toothpastes, mouth washes, and the like. Pharmaceutical compositions include tablet coatings, tablet binders, transdermal patches, and the like.

The synthesis of the modified polymers can be prepared according to the examples set out below. The examples are presented for purposes of demonstrating, but not limiting, the preparation of the compounds and compositions of this invention.

EXAMPLES

In accordance with the present invention, the following examples are provided to illustrate preferred methods for preparing the polymeric moieties containing an anhydride.

Example 1

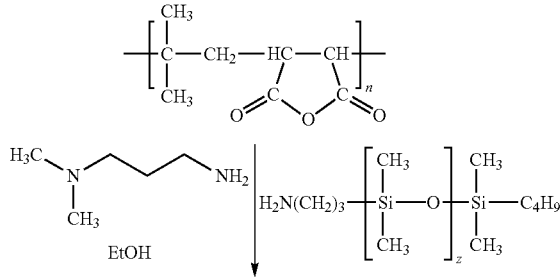

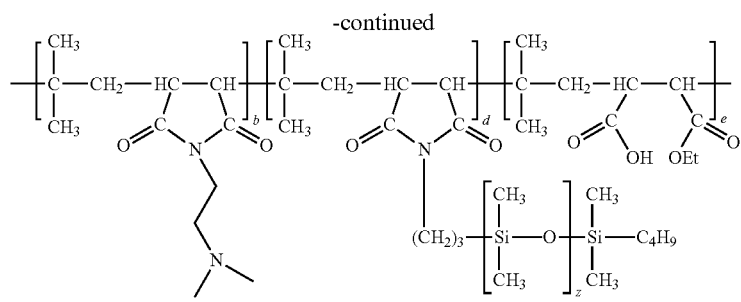

Typically 44.4 g of poly(isobutylmethacrylate) (PIBMA), 23.5 g of dimethylaminopropylamine (DMAPA), 17.5 g triethylamine (TEA), with 537.2 g ethanol were charged to a 1 L Parr reactor. The reactor was sealed, purged three times with $N_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. Next appropriate amount of monoamino-terminated polydimethylsiloxane (PDMS, z=2-3) (determined by desired PDMS grafting degree) was charged into the reactor. The reactor was sealed, purged three times with $N_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. After the derivatization, the product in ethanol was obtained by ethanol exchange in order to remove triethylamine.

Example 2

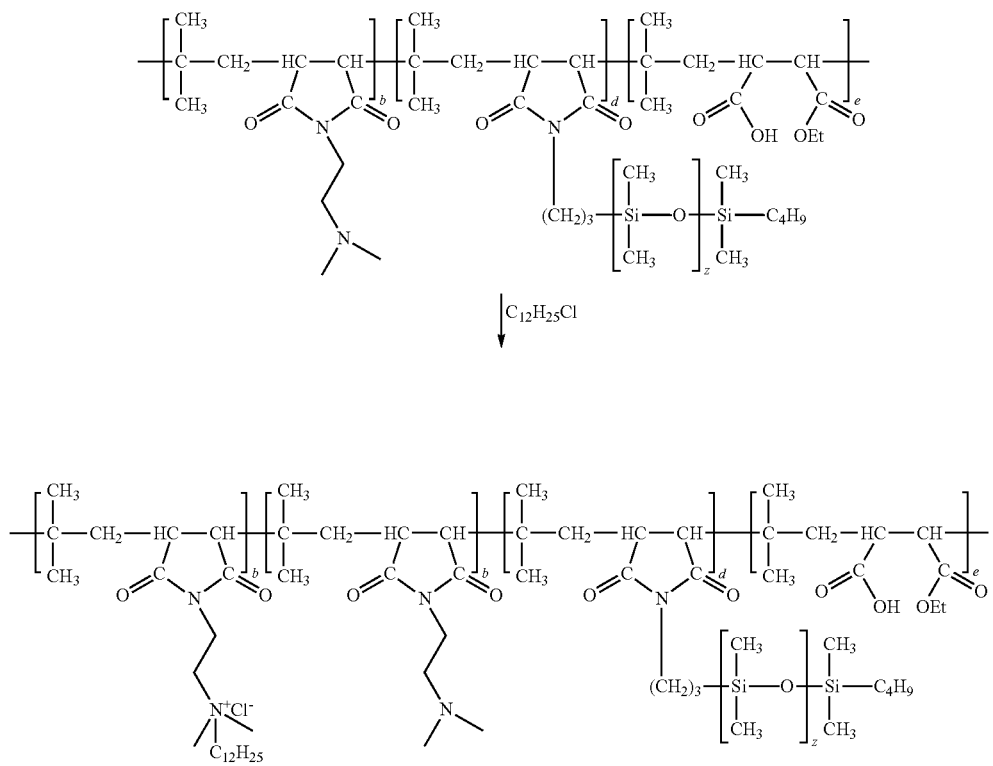

The solution of pseudo cationic PIB-MA containing PDMS (product from Example 1) in ethanol was mixed with appropriate amount of chlorodecane (determined by desired PDMS quaternization degree). The reaction was performed at 120° C. in a sealed reactor under pressure. The solvent was either ethanol or the mixture of ethanol with water. The reaction was monitored by titration until the base number did not change any more.

Example 3

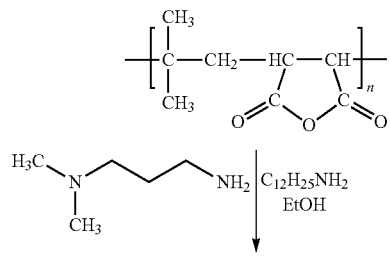

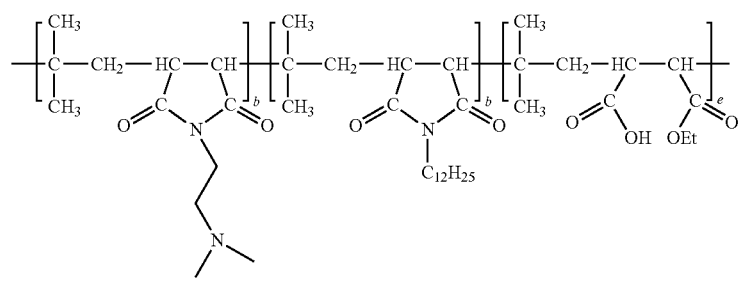

Typically 46.3 g PIB-MA, 24.6 g DMAPA, 18.3 g triethylamine, appropriate amount of dodecylamine (determined by desired grafting degree) with 537.2 g ethanol were charged to a 1 L Parr reactor. The reactor was sealed, purged three times with $N_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. After the derivatization, the product in ethanol was obtained by ethanol exchange in order to remove triethylamine.

Example 4

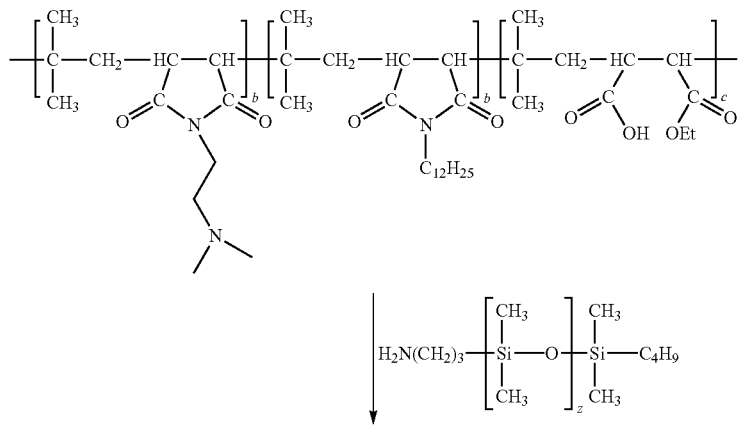

-continued

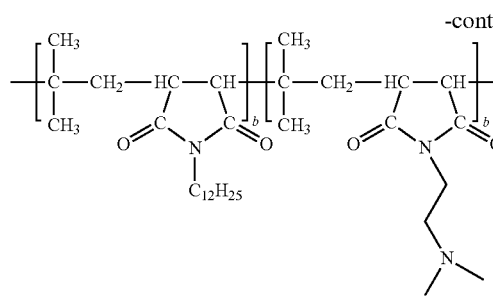 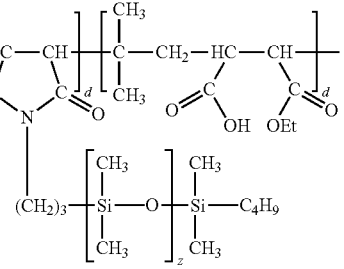

Typically 45.7 g PIB-MA, 24.0 g DMAPA, 17.8 g triethylamine, appropriate amount of dodecylamine (determined by desired grafting degree) with 541.5 g ethanol were charged to a 1 L Parr reactor. The reactor was sealed, purged three times with $N_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. Next appropriate amount of monoamino-terminated PDMS (determined by desired PDMS grafting degree) was charged into the reactor. The reactor was sealed, purged three times with $N_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. After the derivatization, the product in ethanol was obtained by ethanol exchange in order to remove triethylamine.

Example 5

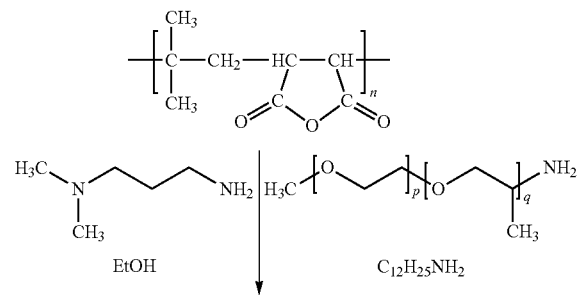

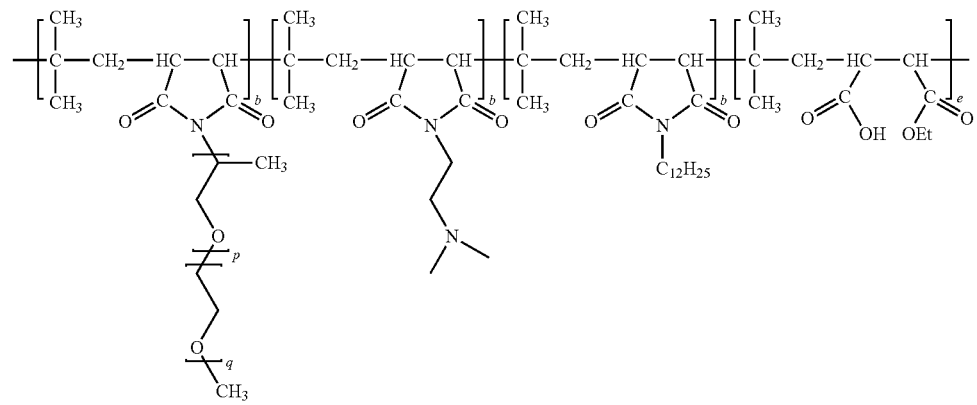

Typically 80.0 g PIB-MA, 42.4 g DMAPA, 56.9 g Jeffamine (polyether amine, p=10, q=31, 5.3 g triethylamine, appropriate amount of dodecylamine (determined by desired grafting degree) with 441.8 g ethanol were charged to a 1 L Parr reactor. The reactor was sealed, purged three times with $N_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. After the derivatization, the product in ethanol was obtained by ethanol exchange in order to remove triethylamine.

Example 6

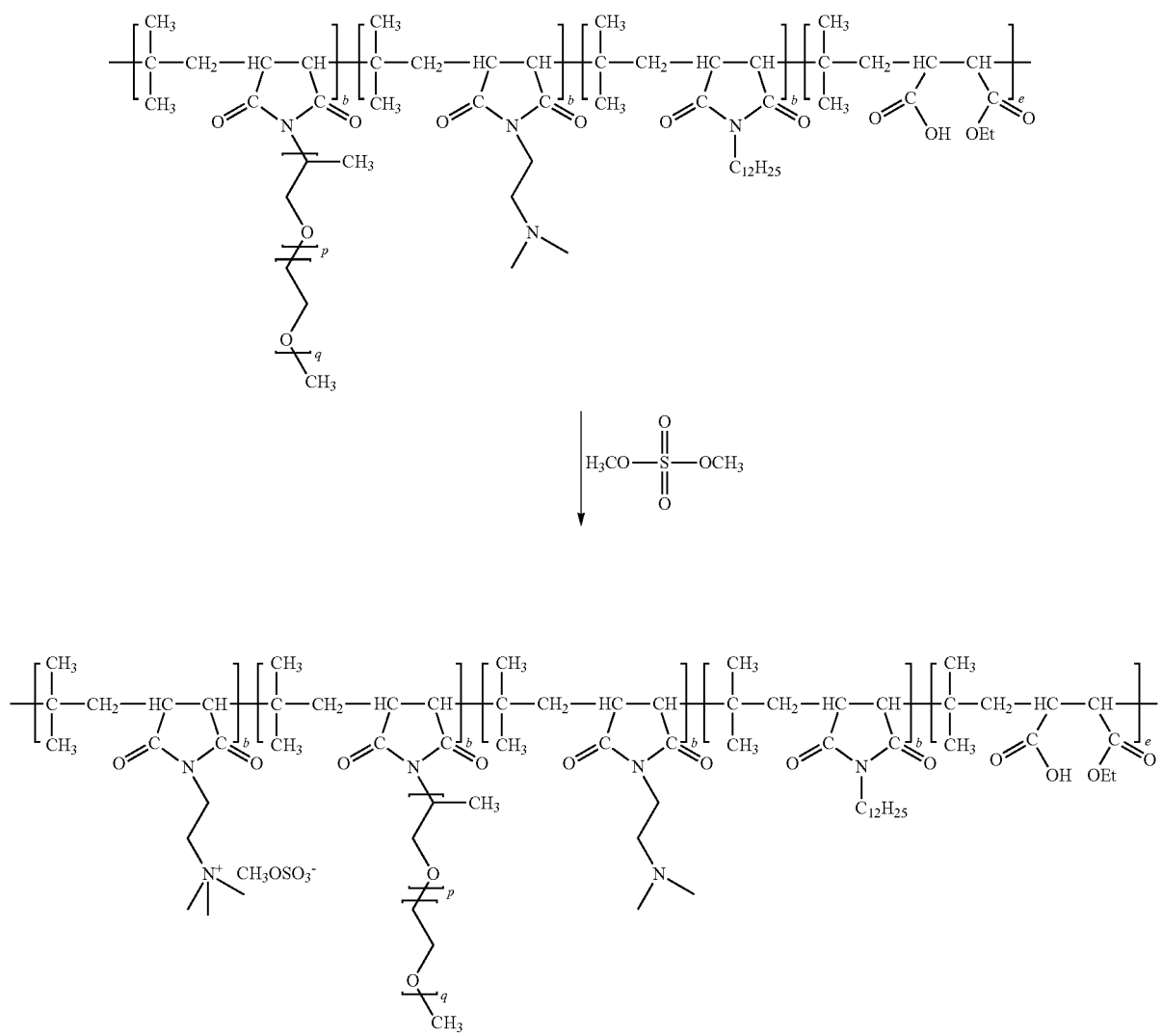

The product from Example 5 was titrated with 0.10N HCl in order to determine the number of reactive groups in the polymer sample. Approximately 100 g of polymer solution was added to a 500 ml pear flask. The titration result was used to calculate the required amount of either diethyl sulfate or dimethyl sulfate for the quaternization. The quaternization agent was added to the flask, which was placed on a rotary evaporator. The sample was mixed at ambient temperature until it was uniform and then heated at 60° C. for approximately 6 hours. Finally, the quaternized polymer was obtained by water exchange.

Example 7

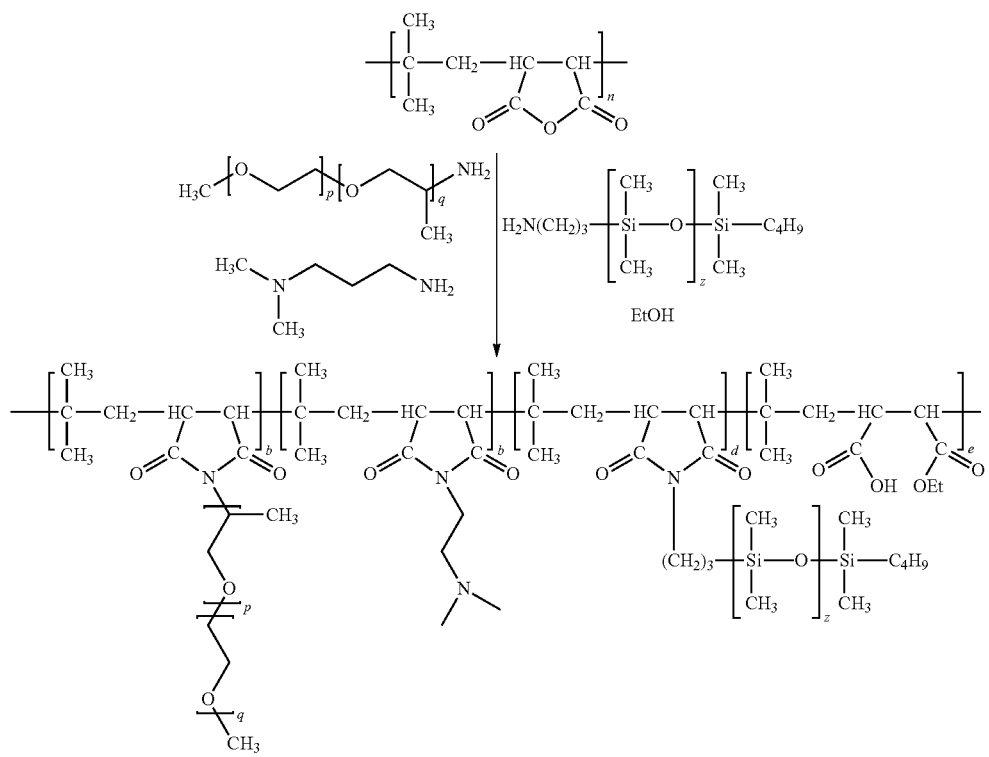

Typically 78.5 g PIB-MA, 41.6 g DMAPA, 55.8 g Jeffamine, 5.2 g triethylamine, appropriate amount of mono-amino-terminated PDMS (determined by desired PDMS grafting degree) with 441.8 g ethanol were charged to a 1 L Parr reactor. The reactor was sealed, purged three times with N$_2$ gas, and heated according to the following heating profile: raise the reaction temperature from ambient to 125° C. in 1 hr; keep the reaction temperature at 125° C. for 12 hr; lower the reaction temperature from 125° C. to 30° C. in 1 hr, then stop the reaction. After the derivatization, the product in ethanol was obtained by ethanol exchange in order to remove triethylamine.

Example 8

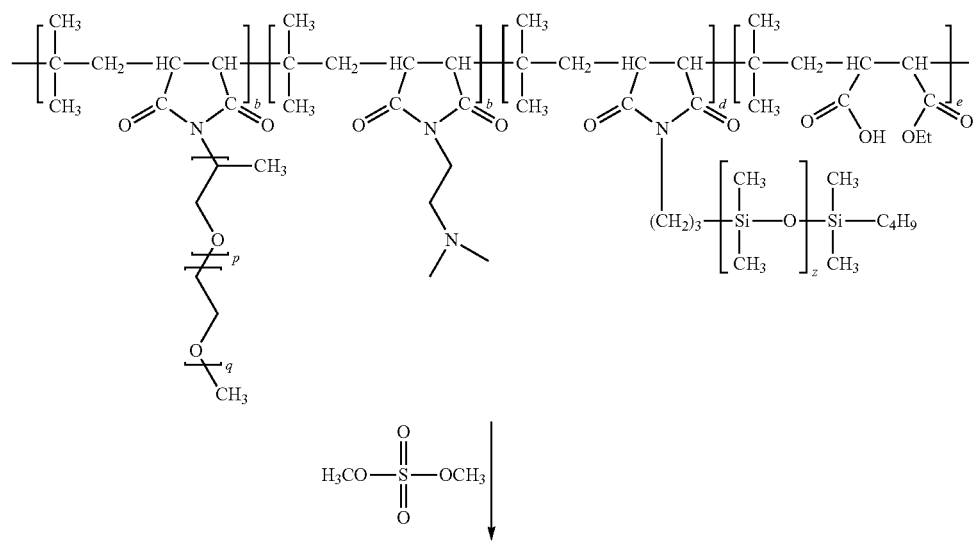

-continued

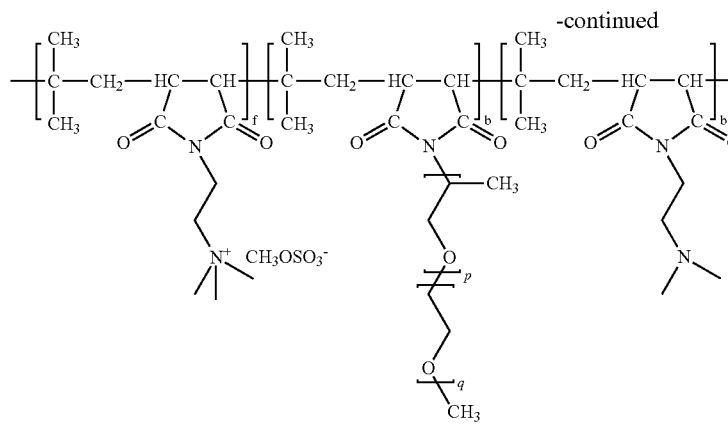

The product from Example 7 was titrated with 0.10N HCl in order to determine the number of reactive groups in the polymer sample. Approximately 100 g of polymer solution was added to a 500 ml pear flask. The titration result was used to calculate the required amount of either diethyl sulfate or dimethyl sulfate for the quaternization. The quaternization agent was added to the flask, which was placed on a rotary evaporator. The sample was mixed at ambient temperature until it was uniform and then heated at 60° C. for approximately 6 hours. Finally, the quaternized polymer was obtained by water exchange.

While a number of embodiments of this invention have been represented, it is apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

We claim:

1. A polymer resulting from modification of a polymeric moiety containing an anhydride with a modifying reactant moiety, wherein the polymeric moiety containing an anhydride has the structure:

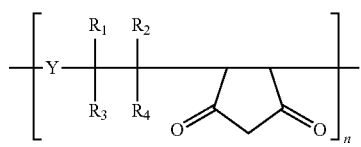

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; Y is derived from the group consisting of vinyl amides, acrylates, styrenes, maleimides, maleates, fumarates, cinnamyls, vinyl imidazoles, vinyl pyridines, vinyl acetates, acrylamides, vinyl sulfones, vinyl carbonates, vinyl silanes, vinyl acrylamides, allyl derivatives, vinyl ethers, and mixtures thereof; and n is an integer ranging from about 10 to about 100,000; the modifying reactant moiety is selected from the group consisting of Q-$R_{10}$—$NH_2$, Z—$NH_2$, and E-OH, and mixtures thereof; wherein Q is a siloxane and $R_{10}$ is selected from the group consisting of alkyl, cycloalkyl, and aryl groups; Z is selected from the group consisting of hydrogen, alkyl, haloalkyl, aryl, silyl, and tertiary amine groups having the structure:

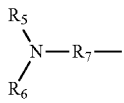

quaternary amine groups having the structure:

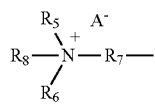

and polyether groups having the structure:

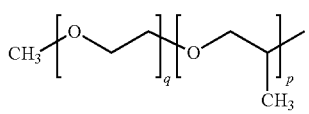

wherein $R_5$, $R_6$, $R_7$, and $R_8$ are independently selected from the group consisting of alkyl, cycloalkyl, and aryl groups; A⁻ is an anion; q and p are integers independently ranging from about 1 to about 10,000; E is a siloxane or is selected from the group consisting of hydrogen, alkyl, haloalkyl, aryl, silyl, amino groups, and mixtures thereof; to provide a modified polymer having the structure:

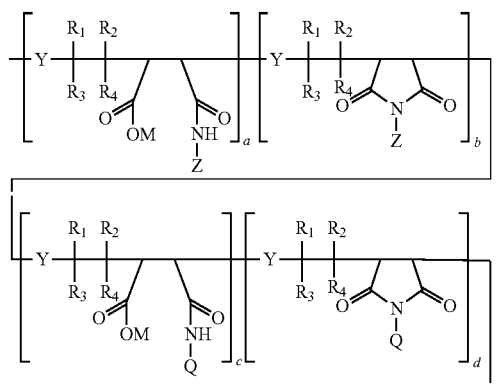

-continued

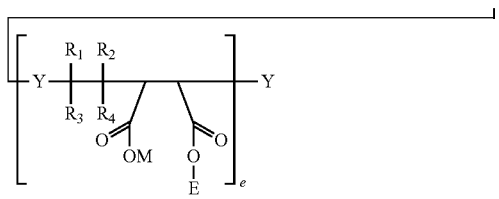

wherein $R_1$, $R_2$, $R_3$, and $R_4$ are as described above; Q, Z, and E are derived from the modifying reactant moieties as described above; M is hydrogen or a monovalent or divalent metal ion; a, b, c, d, and e are integers independently ranging from 0 to about 10,000; with the proviso that no more than two of a, b, c, d and e can be zero at the same time; wherein the polymer is alternating, blocked, or random.

2. The polymer according to claim 1, wherein $R_1$, $R_2$, $R_3$, and $R_4$ are independently selected from the group consisting of hydrogen, alkyl, and alkoxy groups.

3. The polymer according to claim 1, wherein Y is derived from the group consisting of vinyl amides, acrylates, vinyl imidazoles, vinyl pyridines, vinyl acetates, acrylamides, and mixtures thereof.

4. The polymer according to claim 1, wherein the siloxane has the structure:

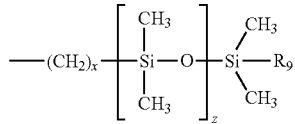

wherein $R_9$ is an alkyl or cycloalkyl group, and x and z are integers independently ranging from about 1 to about 10,000.

5. The polymer according to claim 1, wherein Z is selected from the group consisting of hydrogen, alkyl, haloalkyl, aryl, silyl, and tertiary amine groups having the structure:

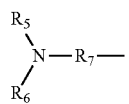

and quaternary amine groups having the structure:

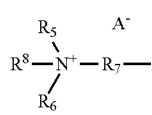

wherein $R_5$, $R_6$, $R_7$, and $R_8$ are independently selected from the group consisting of $C_1$-$C_{18}$ alkyl groups.

6. The polymer according to claim 1, wherein when E is a siloxane, the siloxane has the structure:

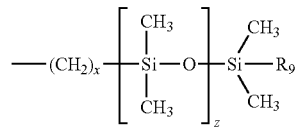

wherein $R_9$ is an alkyl or cycloalkyl group, and x and z are integers independently ranging from about 1 to about 10,000, or E is selected from the group consisting of alkyl, haloalkyl, and aryl groups, and mixtures thereof.

7. A composition comprising a polymer resulting from modification of a polymeric moiety containing an anhydride with a modifying reactant moiety, wherein the polymeric moiety containing an anhydride has the structure:

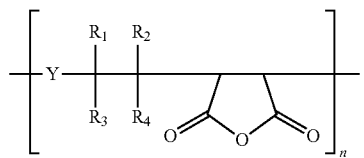

wherein $R_1$, $R_2$, $R_3$, and $R_4$ are independently selected from the group consisting of hydrogen, alkyl, alkoxy, cycloalkyl, aryl, ester, carboxylic acid, halo, and silyl groups; Y is derived from the group consisting of vinyl amides, acrylates, styrenes, maleimides, maleates, fumarates, cinnamyls, vinyl imidazoles, vinyl pyridines, vinyl acetates, acrylamides, vinyl sulfones, vinyl carbonates, vinyl silanes, vinyl acrylamides, allyl derivatives, vinyl ethers, and mixtures thereof; and n is an integer ranging from about 10 to about 100,000; the modifying reactant moiety is selected from the group consisting of Q-$R_{10}$—$NH_2$, Z—$NH_2$, and E-OH, and mixtures thereof; wherein Q is a siloxane and $R_{10}$ is selected from the group consisting of alkyl, cycloalkyl, and aryl groups; Z is selected from the group consisting of hydrogen, alkyl, haloalkyl, aryl, silyl, and tertiary amine groups having the structure:

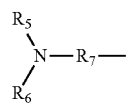

quaternary amine groups having the structure:

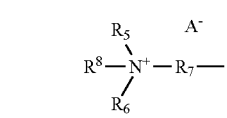

and polyether groups having the structure:

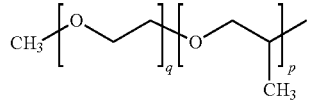

wherein $R_5$, $R_6$, $R_7$, and $R_8$ are independently selected from the group consisting of alkyl, cycloalkyl, and aryl groups; $A^-$ is an anion; q and p are integers independently ranging from about 1 to about 10,000; E is a siloxane or is selected from the group consisting of hydrogen, alkyl, haloalkyl, aryl, silyl, amino groups, and mixtures thereof; to provide a modified polymer having the structure:

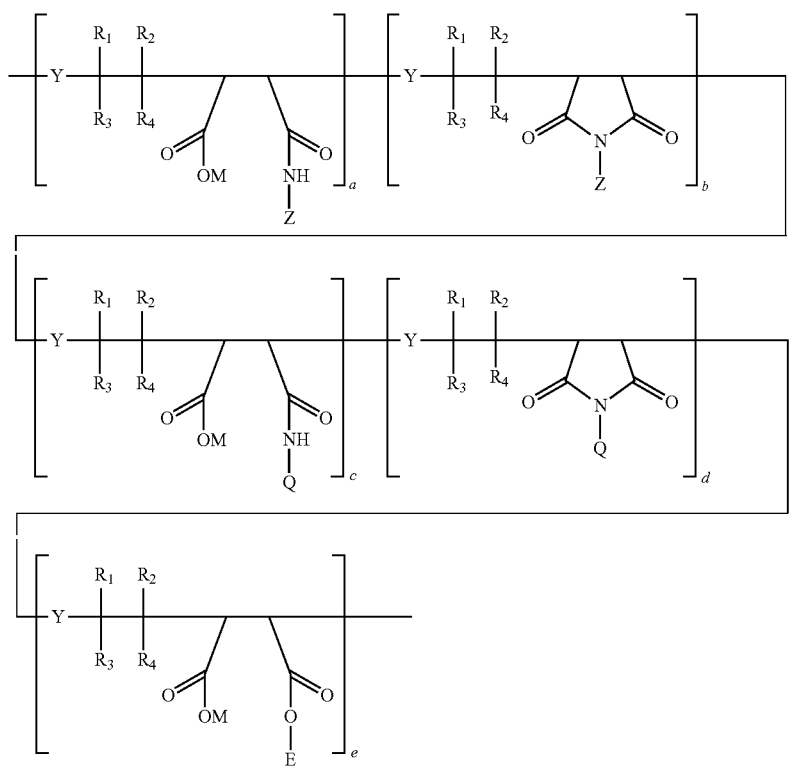

wherein $R_1$, $R_2$, $R_3$, and $R_4$ are as described above; Q, Z, and E are derived from the modifying reactant moieties as described above; M is hydrogen or a monovalent or divalent metal ion; a, b, c, d, and e are integers independently ranging from 0 to about 10,000; with the proviso that no more than two of a, b, c, d and e can be zero at the same time; wherein the polymer is alternating, blocked, or random.

8. The composition according to claim 7, wherein the composition is adhesive, aerosol, agricultural composition, beverage, cleaning composition, coating composition, cosmetic formulation, dental composition, detergent, drug, encapsulation, food, hair spray, lithographic solution, membrane formulation, oilfield formulation, personal care composition, pharmaceutical, or pigment dispersion.

9. The composition according to claim 7, wherein $R_1$, $R_2$, $R_3$, and $R_4$ are independently selected from the group consisting of hydrogen, alkyl, and alkoxy groups.

10. The composition according to claim 7, wherein Y is derived from the group consisting of vinyl amides, acrylates, vinyl imidazoles, vinyl pyridines, vinyl acetates, acrylamides, and mixtures thereof.

11. The composition according to claim 7, wherein the siloxane has the structure:

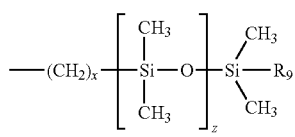

wherein $R_9$ is an alkyl or cycloalkyl group, and x and z are integers independently ranging from about 1 to about 10,000.

12. The composition according to claim 7, wherein Z is selected from the group consisting of hydrogen, alkyl, haloalkyl, aryl, silyl, and tertiary amine groups having the structure:

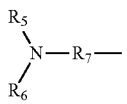

and quaternary amine groups having the structure:

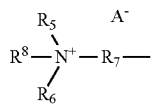

wherein $R_5$, $R_6$, $R_7$, and $R_8$ are independently selected from the group consisting of $C_1$-$C_{18}$ alkyl groups.

13. The composition according to claim 7, wherein when E is a siloxane, the siloxane has the structure:

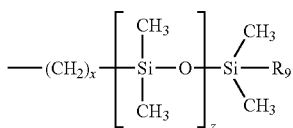

wherein $R_9$ is an alkyl or cycloalkyl group, and x and z are integers independently ranging from about 1 to about 10,000, or E is selected from the group consisting of alkyl, haloalkyl, and aryl groups, and mixtures thereof.

\* \* \* \* \*